US010665952B2

(12) United States Patent
Fina et al.

(10) Patent No.: US 10,665,952 B2
(45) Date of Patent: May 26, 2020

(54) MICROWAVE ANTENNA MODULE FOR SPACE APPLICATIONS INCLUDING A HYBRID TRANSMIT/RECEIVE MODULE OF PACKAGE ON PACKAGE TYPE

(71) Applicant: Thales Alenia Space Italia S.p.A. Con Unico Socio, Rome (IT)

(72) Inventors: Antonio Fina, Rome (IT); Alessandro Di Carlofelice, L'Aquila (IT); Francesco De Paulis, L'Aquila (IT); Ulisse Di Marcantonio, Rome (IT); Andrea Suriani, Rome (IT); Piero Tognolatti, L'Aquila (IT); Antonio Orlandi, L'Aquila (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 345 days.

(21) Appl. No.: 16/047,407

(22) Filed: Jul. 27, 2018

(65) Prior Publication Data

US 2019/0067824 A1 Feb. 28, 2019

(30) Foreign Application Priority Data

Jul. 27, 2017 (IT) .......................... 102017000086529

(51) Int. Cl.
*H01Q 13/18* (2006.01)
*G01S 13/90* (2006.01)
(Continued)

(52) U.S. Cl.
CPC ............. *H01Q 13/18* (2013.01); *G01S 7/032* (2013.01); *G01S 7/034* (2013.01); *G01S 7/4017* (2013.01);
(Continued)

(58) Field of Classification Search
CPC ........ H01Q 13/18; H01Q 1/422; H01Q 13/08; H01Q 1/38; G01S 13/90; H04B 7/18515
See application file for complete search history.

(56) References Cited

U.S. PATENT DOCUMENTS

| 9,620,841 | B2 * | 4/2017 | Tong ....................... G01S 7/032 |
| 9,887,449 | B2 * | 2/2018 | Qiang ..................... G01S 13/02 |
| 10,103,447 | B2 * | 10/2018 | Tong ....................... H01Q 19/10 |

FOREIGN PATENT DOCUMENTS

| EP | 1307078 | 5/2003 |
| EP | 1311072 | 5/2003 |

OTHER PUBLICATIONS

Fino et al., an Advanced Transmit/Receive 3D Ceramic Hybrid Circuit Module for Space Applications, 2015 European Microwave Conversnce (EUMC), Sep. 7, 2015, pp. 785-788.
(Continued)

*Primary Examiner* — Graham P Smith
*Assistant Examiner* — Jae K Kim
(74) *Attorney, Agent, or Firm* — McCarter & English, LLP

(57) ABSTRACT

The invention concerns a microwave antenna module for use in an antenna system installed on board a space platform. The disclosed microwave antenna module includes a transmit/receive module, which comprises: a first package and a second package, that are hermetically sealed to one another and that are multilayer ceramic substrate packages; and an interposer connector, that is interposed between the first and second packages and comprises a body and connection means provided in the body. First and second electronic circuitries are connected to the connection means of the interposer connector for routing microwave, control and power signals through the connection means. The first electronic circuitry includes a directional coupler in stripline-coplanar configuration. Each microwave connection
(Continued)

assembly includes: a respective first metal element, that extends through the body perpendicularly to a top surface and a bottom surface of the body, protruding from the top and bottom surfaces; a respective first dielectric element, that is coaxial with, and extends around, the respective first metal element surrounding completely the respective first metal element, and extends through the body between the top surface and the bottom surface thereof; and respective second metal elements, that are spaced apart from, and surround at least partially, the respective first dielectric element, extend through the body perpendicularly to the top and bottom surfaces thereof, protruding from the top and bottom surfaces, and are in electrical contact with the body, thereby being at the same electrical potential as the body.

20 Claims, 5 Drawing Sheets

(51) Int. Cl.
| | |
|---|---|
| *H04B 7/185* | (2006.01) |
| *H01Q 13/08* | (2006.01) |
| *H01Q 1/38* | (2006.01) |
| *H01Q 1/42* | (2006.01) |
| *H01P 5/18* | (2006.01) |
| *G01S 7/03* | (2006.01) |
| *G01S 7/40* | (2006.01) |
| *H01Q 1/28* | (2006.01) |
| *H01Q 19/17* | (2006.01) |
| *H01P 3/12* | (2006.01) |
| *H01Q 3/26* | (2006.01) |
| *H01P 3/00* | (2006.01) |
| *H01P 3/06* | (2006.01) |
| *G01S 13/02* | (2006.01) |
| *G01S 7/02* | (2006.01) |

(52) U.S. Cl.
CPC .............. *G01S 13/90* (2013.01); *H01P 3/003* (2013.01); *H01P 3/06* (2013.01); *H01P 3/121* (2013.01); *H01P 5/185* (2013.01); *H01Q 1/288* (2013.01); *H01Q 1/38* (2013.01); *H01Q 1/422* (2013.01); *H01Q 3/267* (2013.01); *H01Q 13/08* (2013.01); *H01Q 13/085* (2013.01); *H01Q 19/17* (2013.01); *H04B 7/18515* (2013.01); *G01S 2007/028* (2013.01); *G01S 2013/0254* (2013.01)

(56) References Cited

OTHER PUBLICATIONS

Italian Search Report and Written Opinion for IT 102017000086529 dated Apr. 10, 2018.

* cited by examiner

MICROWAVE ANTENNA MODULE FOR SPACE APPLICATIONS INCLUDING A HYBRID TRANSMIT/RECEIVE MODULE OF PACKAGE ON PACKAGE TYPE

CROSS-REFERENCE TO RELATED APPLICATIONS

This application claims priority from Italian Patent Application No. 102017000086529 filed on Jul. 27, 2017, the disclosure of which is incorporated by reference.

TECHNICAL FIELD OF THE INVENTION

The present invention relates, in general, to antenna systems installed on board space platforms, such as satellite antennas. In particular, the present invention concerns the technical field of microwave antennas installed on board space platforms and provided with Transmit/Receive (T/R) modules, such as those exploited in phased array antenna systems (for example, employed in Synthetic Aperture Radars (SARs)), or in electronically steerable planar radiating arrays used as feeder in single/double-reflector antennas.

STATE OF THE ART

As broadly known, a phased array antenna system, for example employed in a SAR, typically includes a plurality of T/R modules and a radiating array.

In use, microwave signals to be transmitted are fed to the T/R modules (for example, through a beam forming network) to be amplified (for example, by means of High Power Amplifiers (HPAs)) and phase-shifted by said T/R modules, and then radiated by the radiating array. In reception, incoming microwave signals received by the radiating array are amplified (for example, by means of Low Noise Amplifiers (LNAs)) and phase-shifted by the T/R modules.

A typical example of radiating array employed in phased array antenna systems is a planar array of patch antennas made in the form of a single panel/board connected to the T/R modules by means of microwave connectors (such as coaxial cables), wherein each T/R module is coupled to a respective group of patch antennas (such as a row of patch antennas) for feeding said respective group of patch antennas with respective microwave signals to be radiated and for receiving respective incoming microwave signals received by said respective group of patch antennas.

An example of phased array antenna system is disclosed in U.S. Pat. No. 7,151,502 B2, which relates to a phased antenna array composed of one or more modules and having a plurality of antennas configured to operate as an array, wherein each module has at least one antenna; the modules have a substrate that supports the antenna, a microelectronic device for sending signals to or receiving signals from said antenna, and conductive traces that connect that antenna to the microelectronic device; in those embodiments where the phased antenna array has more than one module, a common substrate supports the modules; a combination of circuitry and interconnects achieves the desired electrical interconnection between the modules.

Nowadays, three-dimensional (3D) packaging technologies are also used to manufacture T/R modules for phased array radar applications. 3D packaging allows to reduce T/R module footprint and to increase microwave electronics density. Both aspects are very important in applications where inter-module spacing requirements (related to signals' wavelength) impose heavy geometrical constrains on radiating elements. An example of an application that benefits from such approach is an Active Electronically Scanned Array (AESA) antenna, in which the T/R modules disposition is tightly conditioned by the radiating elements interspacing. In this case, 3D packaging enables enhanced performances and more efficient architectures. A 3D packaging approach for the T/R modules allows to increase the AESA maximum scanning angle and to implement a "tile-based" (planar) architecture for the AESA itself, which in turn greatly increases its integration level and reduces its weight and volume with respect to conventional "brick-based" architectures. Additional benefits that come from the tile-based architecture are: a reduction of external interfaces (which further improves AESA integration level), a lower complexity of the overall AESA sub-system (in particular, in relation to signals distribution), and a reduction in the overall manufacturing cost.

An example of 3D-packaging-based T/R module is disclosed in A. Fina et al., "*An Advanced Transmit/Receive 3D Ceramic Hybrid Circuit Module for Space Applications*", 2015 European Microwave Conference (EuMC), 7-10 Sep. 2015, Paris, France, Proceedings of the 45th EuMC, pages 785-788.

In particular, this scientific paper describes a hybrid T/R module for space applications, which hybrid T/R module is based on the use of 3D interconnection technologies and presents the following features:

low footprint, high performance, metal-ceramic integral substrate package solution;

assembly of active and passive components on two different planes inside a hermetic cavity; and implementation of reliable radiofrequency (RF), control and direct current (DC) power interconnections along the z-axis of the hybrid T/R module.

In FIG. 1 a schematic side view of the hybrid T/R module (denoted as a whole by 1) according to "*An Advanced Transmit/Receive 3D Ceramic Hybrid Circuit Module for Space Applications*" is shown.

In particular, the hybrid T/R module 1 is a Package on Package (PoP) device and comprises:

a first package 11 housing a HPA, a LNA and a single-pole, double-throw (SPDT) switch;

an interposer connector 12, that is arranged on the first package 11 and comprises a body and fuzz-button contacts provided in said body; and a second package 13, which is arranged on the interposer connector 12 and houses a core chirp.

The first and second packages 11,13 connect to each other through the interposer connector 12, whose body can be made either of a metallic or a gold plated polymer material, so that a good electromagnetic isolation between the upper and lower cavities of the PoP hybrid T/R module 1 can be obtained.

Hermetic package design of the PoP hybrid T/R module 1 is based on a metal-ceramic integral substrate package approach using Low Temperature Cofired Ceramics (LTCC). The PoP assembly is made up of two halves or "shells", each one being a hermetic metal ceramic housing. One half-module (in particular, the second package 13) contains the metallic frame making up the internal hermetic cavity, and two SMP connectors (for TX input and RX output, respectively) hermetically soldered to it; the other half-module (i.e., the first package 11) contains one SMP antenna connector and the lid (both hermetically soldered to the ceramics).

Additionally, as broadly known, a phased array antenna system, in order to properly operate, requires periodical calibration, whereby phase shifts and amplification values applied by the T/R modules are periodically checked and, if necessary, tuned so as to obtain a desired phase and amplitude distribution and, hence, the required radiating performance.

For calibration purposes, it is, thence, desirable to determine the amplitude of microwave signals transmitted/received by a phased array antenna system. In order to sample and measure these signals, directional couplers are typically employed in T/R modules employed in phased array antenna systems.

In this respect, FIG. 2 schematically illustrates a typical architecture of a directional coupler (denoted as a whole by 2).

In particular, the directional coupler 2 includes a main transmission line 21 and a coupled transmission line 22 arranged in close proximity to each other so as to be electromagnetically coupled.

In detail, the main transmission line 21 includes a first port 211 at one end, and a second port 212 at the other end; the coupled transmission line 22 comprises a coupling port 221 at one end, and an isolation port 222 at the other end; said isolation port 222 is connected to an impedance 23 matching the characteristic impedance of the coupled transmission line 22 (typically, a 50 Ω impedance is used).

In use, the propagation of a signal along the main transmission line 21 induces the propagation of a coupled signal in the coupled transmission line 22, which coupled signal can be extracted at the coupling port 221.

Main parameters characterizing a coupler typically include coupling factor, isolation and directivity. The coupling factor indicates the ratio of power propagating in the main transmission line 21 in a forward direction (i.e., from the first port 211 to the second port 212) to power extracted at the coupling port 221. The isolation indicates leakage of power appearing at the other end of the coupled transmission line 22 (i.e., amount of power coupled from the first port 211 to the isolation port 222), and is desired to be high in modulus (i.e., a small leakage is desired). The directivity, in turn, indicates the difference between isolation and coupling factor, wherein the higher directivity, the better coupler.

Nowadays, directional couplers used in SAR phased array antenna systems are often based on microstrip technology. In this respect, it is worth noting that this kind of directional couplers, though very simple to manufacture, provides a poor directivity due to the intrinsic configuration of the microstrip transmission line, which is characterized by the presence of even and odd electromagnetic wave propagation modes having different phase velocities.

Directional couplers in stripline configuration are also known. For example, U.S. Pat. No. 5,446,464 A discloses a high frequency (HF) transceiver for HF applications (such as radar applications). Said HF transceiver includes a transmit/receive switch coupled to a transmission path and to a receive path of the module. The transmit/receive switch includes a 3 dB directional coupler based on stripline technology and having first, second and third ports, and a decoupled port which is connected to the receive path. Two HF power amplifiers are connected to the first and second ports of the transmit/receive switch to form a balanced amplifier in the transmission path. A HF switch is connected to the first and second ports of the transmit receive switch for short-circuiting the HF output of the balanced amplifier. A switching device is connected to the HF switch and to the receive path for selectively switching the transmission path and the receive path to be operational.

All the above existing solutions for directional couplers often lead to a limited bandwidth, or to a poor calibration accuracy, or both.

OBJECT AND SUMMARY OF THE INVENTION

A general object of the present invention is that of providing a microwave antenna module for space applications, which microwave antenna module provides better performance than existing solutions.

In particular, a specific object of the present invention is that of providing a microwave antenna module provided with a package on package (PoP) hybrid T/R module of the type disclosed in the scientific paper "*An Advanced Transmit/Receive 3D Ceramic Hybrid Circuit Module for Space Applications*", which PoP hybrid T/R module is fitted with:

an optimized interposer connector providing very efficient and very reliable interconnections between packages of said PoP hybrid T/R module; and a high-directivity coupler such that to allow to increase calibration accuracy of antenna systems employing said microwave antenna module.

These and other objects are achieved by the present invention in that it relates to a microwave antenna module for use in an antenna system installed on board a space platform, as defined in the appended claims

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope consistent with the principles and features disclosed herein and defined in the appended claims.

The present invention relates to a microwave antenna module designed, in general, for space applications and, in particular, for microwave antenna systems installed on board space platforms (such as satellites) and fitted with T/R modules, such as those exploited in phased array antenna systems (for example, employed in SARs), or in electronically steerable planar radiating arrays used as feeder in single/double-reflector antennas.

The microwave antenna module according to the present invention includes a hybrid T/R module of the package on package (PoP) type, which hybrid T/R module is fitted with:
an interposer connector for interconnecting, in an efficient and reliable way, packages of said hybrid T/R module; and
a high-directivity coupler in stripline-coplanar configuration.

The stripline-coplanar configuration greatly improves coupler directivity thereby solving the poor directivity problem affecting current directional couplers (in particular, standard microstrip directional couplers), and guarantees, at the same time, a wide operating bandwidth.

Therefore, said high-directivity coupler in stripline-coplanar configuration allows to perform a highly accurate calibration of the hybrid T/R module and, hence, of a phased array antenna system integrating the microwave antenna module according to the present invention.

Figure 1:
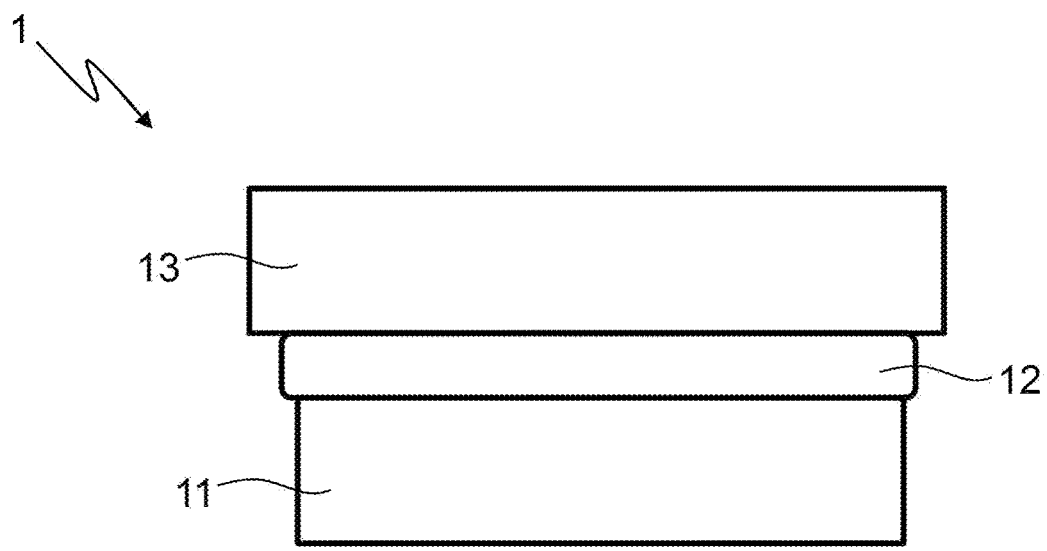
FIG. 1 schematically illustrates a 3D hybrid T/R module according to the prior art.
Figure 2:
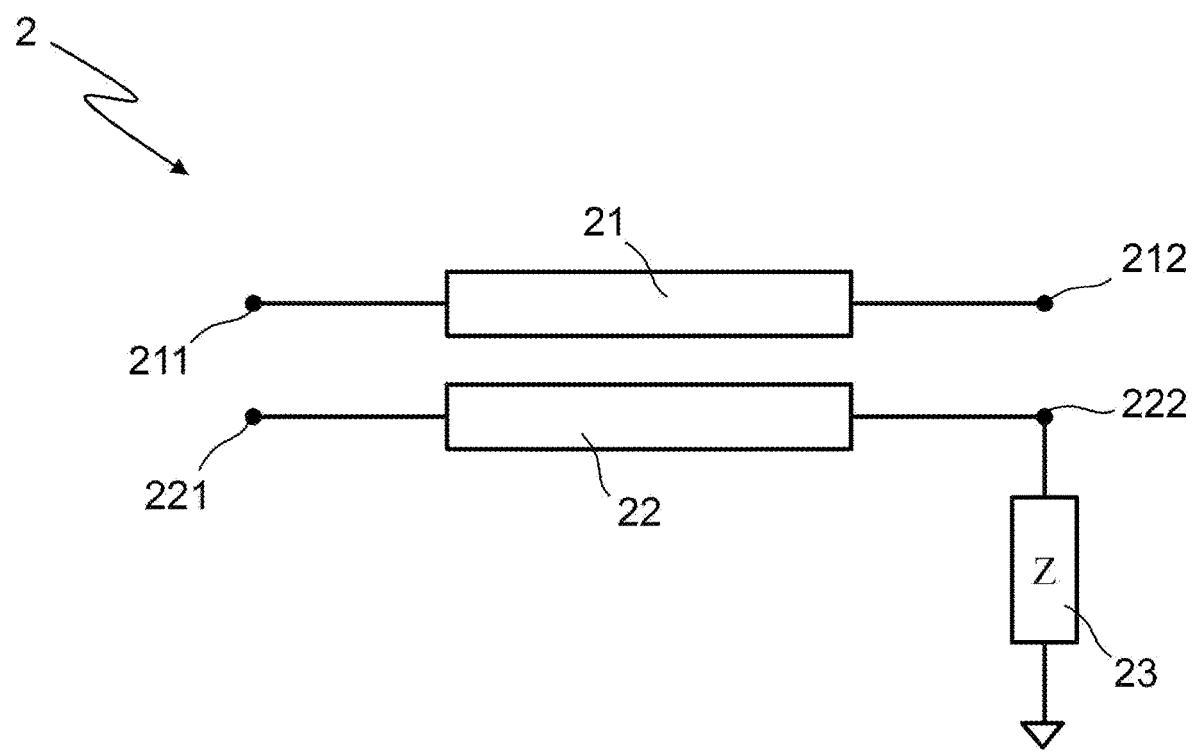
FIG. 2 schematically illustrates a typical architecture of a directional coupler.
Figure 3:
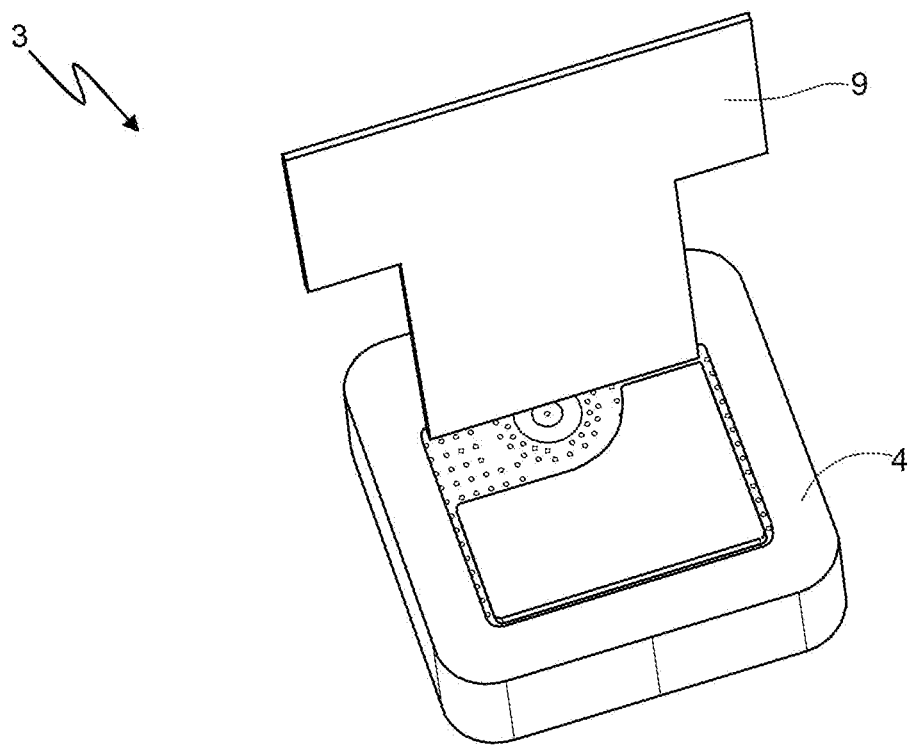
FIG. 3 is a schematic perspective view of a microwave antenna module according to a preferred, non-limiting embodiment of the present invention.
Figure 4:
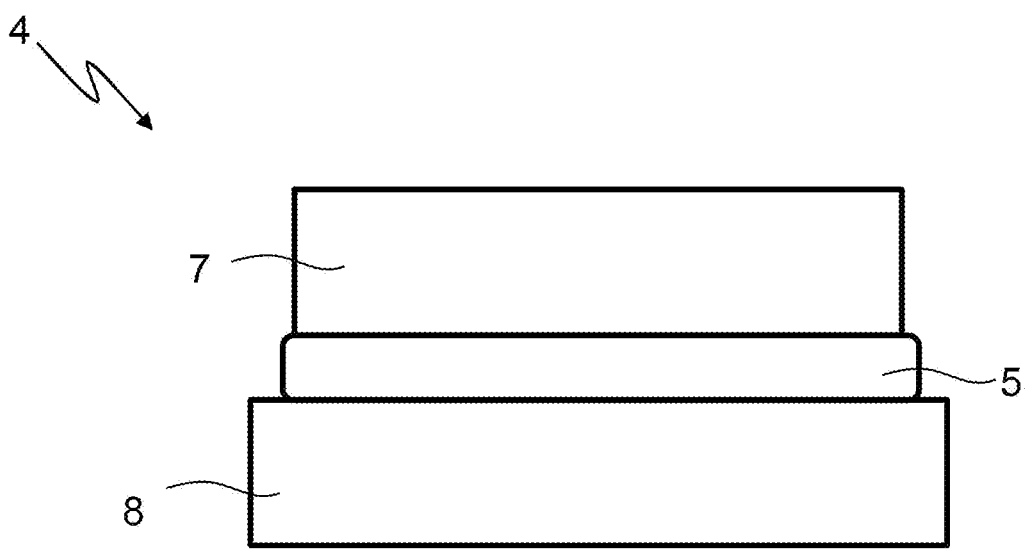
FIG. 4 is a schematic side view of a hybrid T/R module of the microwave antenna module of FIG. 3.
Figure 5:
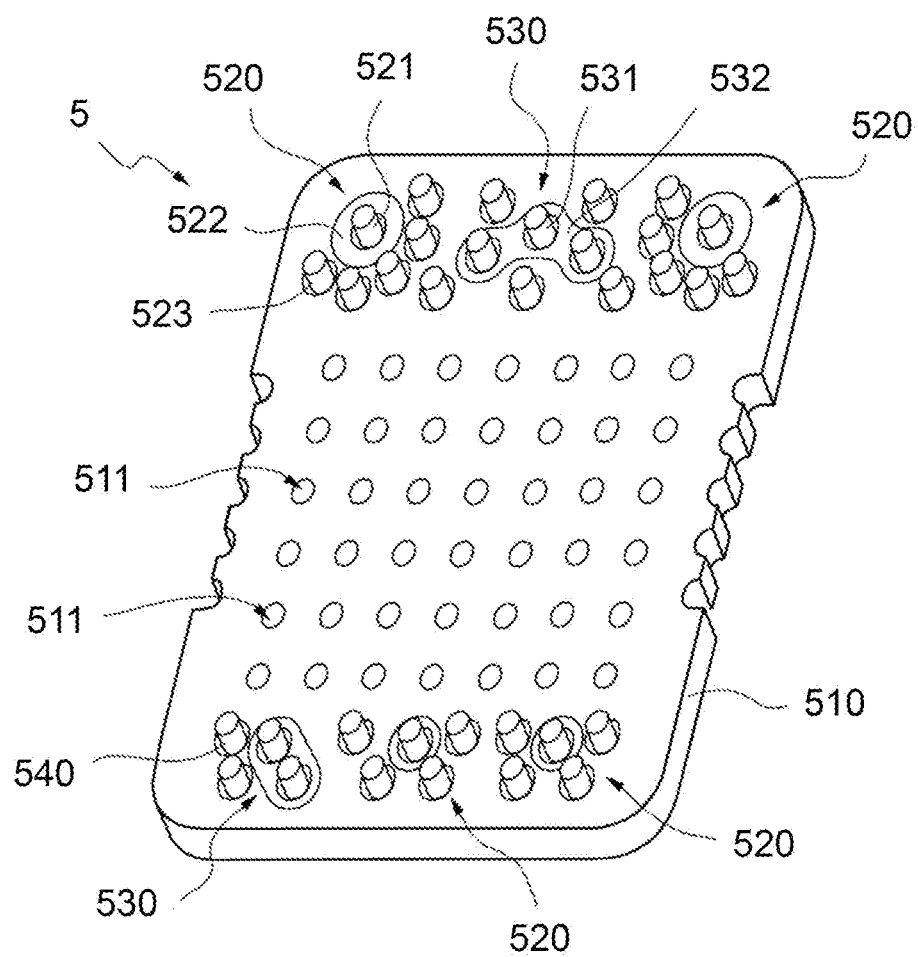
FIG. 5 is a schematic perspective view of an interposer connector of the hybrid T/R module of FIG. 4.
Figure 6:
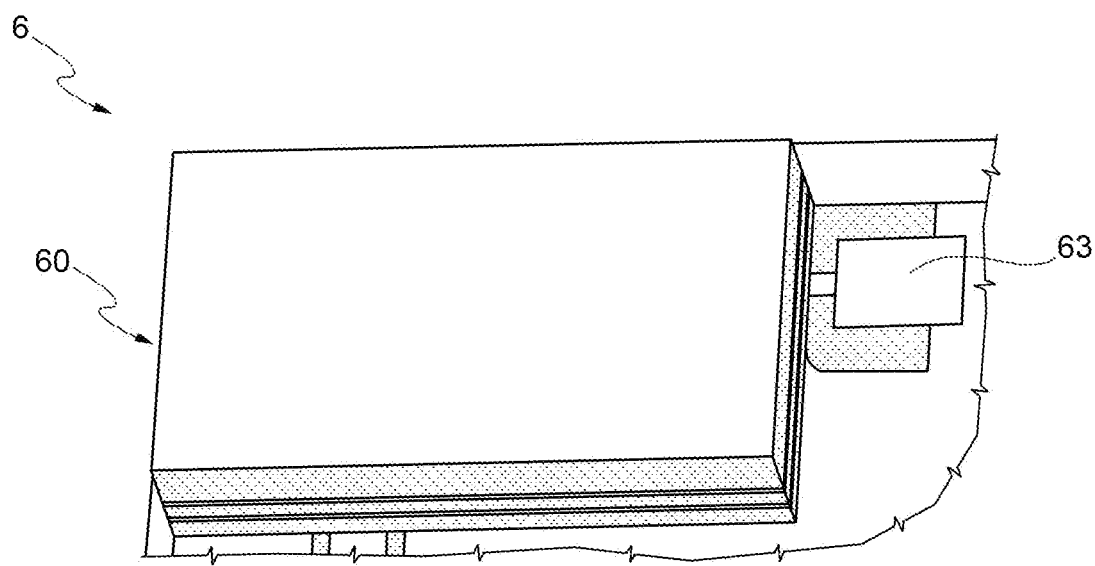
FIGS. 6 and 7 are, respectively, schematic perspective and cutaway views of a directional coupler in stripline-coplanar configuration integrated in the hybrid T/R module of FIG. 4.
Figure 7:
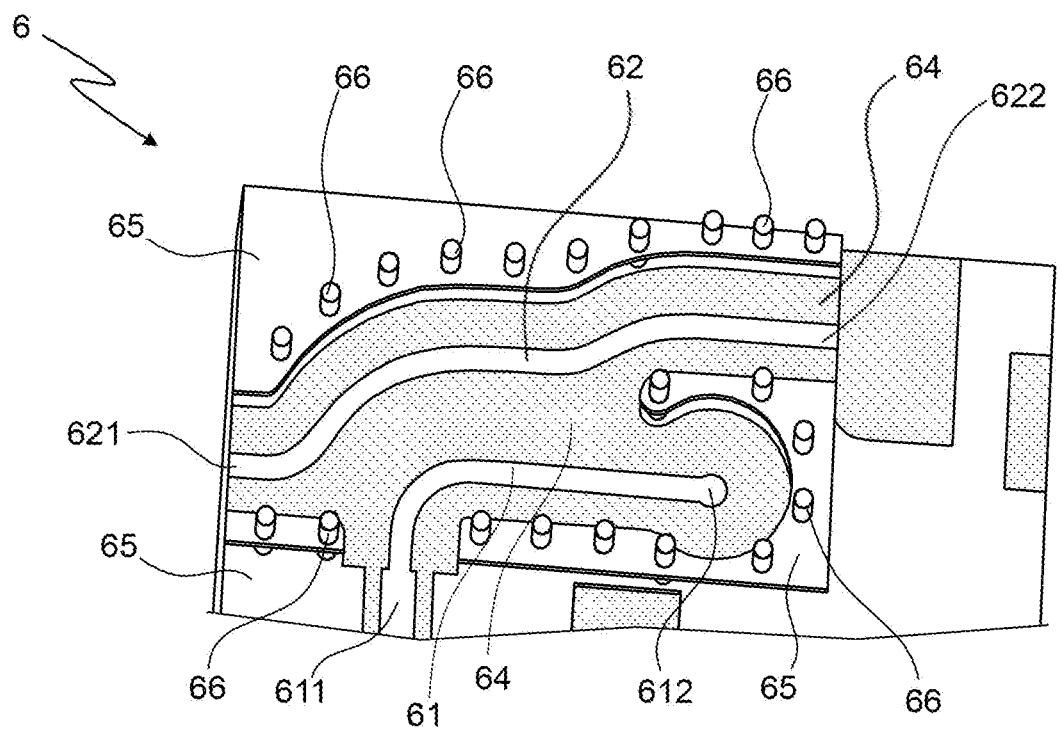

Hereinafter a preferred (but non-limiting) embodiment of the present invention will be described with reference to FIGS. 3-7, where:

FIG. 3 is a schematic perspective view of a microwave antenna module (denoted as a whole by 3) according to said preferred, non-limiting embodiment of the present invention;

FIG. 4 is a schematic side view of a hybrid T/R module (denoted as a whole by 4) of said microwave antenna module 3;

FIG. 5 is a schematic perspective view of an interposer connector (denoted as a whole by 5) of said hybrid T/R module 4;

FIG. 6 is a schematic perspective view of a directional coupler (denoted as a whole by 6) in stripline-coplanar configuration integrated in said hybrid T/R module 4; and FIG. 7 is a schematic cutaway view of the directional coupler 6 with parts selectively removed to show internal architecture of said directional coupler 6.

The microwave antenna module 3 includes the hybrid T/R module 4, which comprises a first package 7 and a second package 8, that are hermetically sealed to one another and that are multilayer ceramic substrate packages. Preferably, said first and second packages 7,8 are metal-ceramic Integral Substrate Packages (ISPs). More preferably, said first and second packages 7,8 are manufactured by using a multilayer ceramic substrate technology, such as LTCC (low temperature cofired ceramics) or HTCC (high temperature cofired ceramics) technology.

Moreover, the hybrid T/R module 4 further comprises the interposer connector 5, that is interposed between said first and second packages 7 and 8, and comprises a body 510 and connection means provided in said body 510.

First electronic circuitry is arranged within a first hermetic internal cavity of the first package 7, and second electronic circuitry is arranged within a second hermetic internal cavity of the second package 8. The first and second electronic circuitries are connected to the connection means of the interposer connector 5 for routing microwave, control and power signals through said connection means.

The first electronic circuitry includes the directional coupler 6 in stripline-coplanar configuration, which is conveniently based on (i.e., manufactured by using) a multilayer ceramic substrate technology, either LTCC or HTCC, and which is conveniently integrated inside a multilayer ceramic substrate containing the remaining first electronic circuitry.

The connection means of the interposer connector 5 include one or more microwave connection assemblies 520 connected to the first and second electronic circuitries for microwave signals routing between said first and second electronic circuitries.

Each microwave connection assembly 520 includes:
a respective first metal element 521, that extends through the body 510 perpendicularly to a top surface and a bottom surface of said body 510, protruding from said top and bottom surfaces;
a respective first dielectric element 522, that
is coaxial with, and extends around, the respective first metal element 521 surrounding completely said respective first metal element 521, and
extends through the body 510 between the top surface and the bottom surface thereof; and
respective second metal elements 523, that
are spaced apart from, and surround at least partially, the respective first dielectric element 522,
extend through the body 510 perpendicularly to the top and bottom surfaces thereof, protruding from said top and bottom surfaces, and
are in electrical contact with the body 510, thereby being at the same electrical potential as said body 510.

Conveniently, for each microwave connection assembly 520, the respective first metal element 521 has a rotational symmetry with respect to an axis of symmetry perpendicular to the top and bottom surfaces of the body 510, and the respective second metal elements 523 are arranged, equidistant or in irregularly way, along a circumference, or a semicircumference, or an arc of a circumference, centered on said axis of symmetry.

Alternatively, said respective second metal elements 523 might be arranged around the respective first dielectric element 522 without following any regular arrangement or specific geometry.

Each microwave connection assembly 520 implements a transmission line for microwave signals by means of a respective coaxial, semi-coaxial or non-regular configuration formed by the respective first metal element 521, the respective first dielectric element 522 and the respective second metal elements 523. Thence, the microwave connection assemblies 520 can be advantageously used for the routing of microwave signals between the first package 7 and the second package 8.

Conveniently, the first and second metal elements 521,523 may be spring electrical contacts (for example, made of copper-beryllium and coated with gold), ball contacts, fuzz buttons, etc.

Again conveniently, the first dielectric elements 522 may be made of polytetrafluoroethylene (for example, Teflon), or a ceramic material. More in general, the dielectric material used to make the first dielectric elements 522 can be conveniently selected on the basis of the characteristic impedance desired for the transmission lines made by the microwave connection assemblies 520 and of the frequency of the signals to be routed therethrough.

Preferably, the microwave antenna module 3 includes also a wide-band antenna 9 (more preferably, a tapered slot antenna, such as a Vivaldi antenna) directly assembled onto the hybrid T/R module 4, in particular mounted on the first package 7. Conveniently, the antenna 9 is based on (i.e., is manufactured by using) a ceramic thin film technology.

Again preferably, the directional coupler 6 includes a signal transmission line 61 and a calibration transmission line 62 electromagnetically coupled to each other (in particular, arranged in close proximity to each other so as to be electromagnetically coupled).

The signal transmission line 61 includes, at a respective first end, a first input/output port 611 and, at a respective second end, a second input/output port 612 connected to the antenna 9. The first input/output port 611 is designed to be fed with microwave signals to be radiated by the antenna 9. The second input/output port 612 is connected to said antenna 9 to feed the latter with the microwave signals to be radiated, and to receive incoming microwave signals received by said antenna 9. The first input/output port 611 is further designed to output the incoming microwave signals.

Conveniently, the second input/output port 612 is connected to the antenna 9 by means of one of the following RF connection means/technologies:
 standard RF connectors (such as SMP, SMPM, etc.);
 wire bonding (for example, based on micro wires);
 adhesive bonding (for example, based on silver-filled, electrically-conductive adhesive epoxy resins);
 welding;
 spring electrical contacts;
 elastomers.

The calibration transmission line 62 includes, at a respective first end, a calibration port 621 and, at a respective second end, an isolation port 622, that is coupled to an impedance 63 matching the characteristic impedance of the calibration transmission line 62 (conveniently, the impedance 63 is a 50 Ω impedance).

Again preferably, the directional coupler 6 includes a multilayer structure 60 (conveniently based on multilayer ceramic substrate technology, such as LTCC or HTCC) including dielectric and metal layers stacked on one another.

The signal and calibration transmission lines 61,62 are formed in a first region of one and the same given metal layer of the multilayer structure 60, which given metal layer is interposed between two dielectric layers arranged immediately on and below said given metal layer (in FIG. 7 the dielectric layer arranged immediately below said given metal layer being denoted by 64).

A ground structure 65 is formed in a second region of said given metal layer and is spaced apart from the signal and calibration transmission lines 61 and 62, thereby resulting in said signal and calibration transmission lines 61,62 being arranged on one and the same plane along with the ground structure 65, and in a gap being present between said ground structure 65 and said signal and calibration transmission lines 61 and 62.

Said gap is filled with a dielectric material (conveniently, the same dielectric material forming the two dielectric layers arranged immediately on and below the given metal layer), which surrounds said signal and calibration transmission lines 61 and 62.

Moreover, vias 66 are formed to electrically connect the ground structure 65 to upper and lower metal layers of the multilayer structure 60, thereby resulting in ground planes being arranged above and below the signal and calibration transmission lines 61 and 62. Conveniently, said vias 66 extend vertically through the multilayer structure 60, orthogonally to the metal and dielectric layers thereof.

From the foregoing it results that the signal and calibration transmission lines 61,62 are surrounded by a dielectric with ground planes arranged above and below said signal and calibration transmission lines 61,62, whereby a stripline configuration is implemented. Moreover, the signal and calibration transmission lines 61,62 and the ground structure 65 are arranged on one and the same plane, whereby also a coplanar configuration is implemented. Therefore, the directional coupler 6 has a combined stripline-coplanar configuration.

Preferably, the connection means of the interposer connector 5 include at least two microwave connection assembly 520, and the first electronic circuitry further includes:
 a high power amplifier (HPA), that is
 connected to a first microwave connection assembly 520 to receive therethrough the microwave signals to be radiated, and
 designed to apply a high power amplification to said microwave signals to be radiated, thereby producing first amplified microwave signals;
 a low noise amplifier (LNA), that is
 designed to apply a low noise amplification to the incoming microwave signals, thereby producing second amplified microwave signals, and
 connected to a second microwave connection assembly 520 to feed said second microwave connection assembly 520 with the second amplified microwave signals; and
 a transmit/receive switch, or a circulator, that is interposed between the first input/output port 611 of the signal transmission line 61 of the directional coupler 6 and said HPA and LNA for feeding
 said first input/output port 611 with the first amplified microwave signals, and
 the LNA with the incoming microwave signals.

Conveniently, said transmit/receive switch (or said circulator), said LNA and said HPA are integrated into a Single Chip Front End (SCFE) Monolithic Microwave Integrated Circuit (MMIC). More conveniently, also the directional coupler 6 is integrated into said SCFE MMIC.

Conveniently, the first electronic circuitry may comprise further devices, such as passive electronic components (resistors, capacitors, etc.), active electronic components (for example, semiconductor devices), Surface-Mount Devices (SMDs), etc.

Preferably, the second electronic circuitry comprises one or more variable phase shifters, one or more attenuators, and one or more amplifiers.

Conveniently, the second electronic circuitry may comprise also further devices, such as passive electronic components (resistors, capacitors, etc.), active electronic components (for example, semiconductor devices), Surface-Mount Devices (SMDs), etc.

Preferably, the connection means of the interposer connector 5 further include one or more control/power connection assemblies 530 connected to the first and second electronic circuitries for control signals routing between, and/or for power supply to, said first and second electronic circuitries.

Each control/power connection assemblies 530 includes:
 one or more respective third metal elements 531, each of which extends through the body 510 perpendicularly to the top and bottom surfaces thereof, protruding from said top and bottom surfaces; and
 a respective second dielectric element 532, that extends around the respective third metal element(s) 531 surrounding completely said respective third metal element(s) 531, and
 through the body 510 between the top surface and the bottom surface thereof.

The control/power connection assemblies 530 implement transmission lines for control signals carrying commands and/or data, and/or for high/low power signals for power supply. Thence, the control/power connection assemblies 530 can be advantageously used for the routing of control and/or power supply signals between the first package 7 and the second package 8.

Conveniently, also the third metal elements 531 may be spring electrical contacts (for example, made of copper-beryllium and coated with gold), ball contacts, fuzz buttons, etc.

Again conveniently, also the second dielectric elements 532 may be made of polytetrafluoroethylene (for example, Teflon), or a ceramic material. More in general, also the dielectric material used to make the second dielectric elements 532 can be conveniently selected on the basis of the characteristic impedance desired for the transmission lines made by the control/power connection assemblies 530 and of the frequency of the signals to be routed therethrough.

Preferably, the connection means of the interposer connector 5 further include one or more fourth metal elements 540 connected to the first and second electronic circuitries for reference/ground voltage routing between said first and second electronic circuitries.

Each fourth metal element 540:

extends through the body 510 perpendicularly to the top and bottom surfaces thereof, protruding from said top and bottom surfaces; and is in electrical contact with said body 510, thereby being at the same electrical potential as said body 510.

As previously said, the fourth metal elements 540 can be advantageously used to route one or more reference/ground voltages between the first and second packages 7,8.

Conveniently, also the fourth metal elements 540 may be spring electrical contacts (for example, made of copper-beryllium and coated with gold), ball contacts, fuzz buttons, etc.

Preferably, the body 510 of the interposer connector 5 is:

made of a polymeric material, or of a single-layer or multilayer ceramic material; and totally or partially coated with a metal material (such as nickel and/or gold), for electrical signal routing or electromagnetic shielding purposes.

If the body 510 is made of a multilayer ceramic material, passive electronic components (such as resistors, capacitors, etc.) may conveniently be integrated inside said body 510 to implement predefined signal routing paths.

Again preferably, a plurality of through holes 511 with metalized walls (i.e., coated with a metal material, such as nickel and/or gold) are formed in the body 510 of the interposer connector 5, wherein said through holes 511 extend through said body 510 between the top surface and the bottom surface thereof, perpendicularly to said top and bottom surfaces. Said through holes 511 and the respective metalized walls allow to electrically connect the top surface and the bottom surface of the body 510.

Alternatively, the body 510 of the interposer connector 5 may be conveniently made of metal (such as aluminium coated with nickel and/or gold). In this case, a better electromagnetic shielding between the first electronic circuitry and the second electronic circuitry is achieved. If the body 510 is made of metal, the through holes 511 are not necessary.

Preferably, the first and second packages 7,8 are seam-welded to one another, or welded to one another by a solder of gold and tin, or laser-sealed to one another, thereby resulting in said first and second packages 7,8 being hermetically sealed to one another.

More preferably, the first and second packages 7,8 include, each, a respective attachment structure made of metal or a ceramic material; conveniently, said respective attachment structure is ring-shaped; more conveniently, said respective attachment structure is made up of one or more gold plated parts, that may be made of one or more metal materials (such as Kovar® or Invar®) or one or more ceramic materials.

The attachment structures of the first and second packages 7,8 can be conveniently used to seal the hybrid T/R module 4. In particular, in order for said first and second packages 7,8 to be attached to one another, the respective attachment structures may be conveniently glued (for example, by using adhesive materials/means) or welded together (for example, by means of a solder of gold and tin, or by using a laser sealing technique or a seam welding technique).

In this connection, it is worth noting that the use of a solder of gold and tin or, even more, of a laser sealing technique or a seam welding technique allows to achieve extremely high hermetic sealing levels that are compatible with those required for space applications.

Once the first and second packages 7,8 has been attached to one another in the above way, the interposer connector 5 is housed, i.e., encapsulated, within a ring-shaped cavity formed by gluing/welding the attachment structures of said first and second packages 7,8.

Moreover, in order to dissipate heat generated by the first and second electronic circuitries arranged within the first and second packages 7 and 8, these latter may conveniently comprise parts made of diamond-based composites (such as copper-diamond, aluminium-diamond, silver-diamond), or copper-tungsten, or molybdenum, or copper-molybdenum.

Preferably, one or more of the following devices/means may be arranged/mounted/installed/integrated/housed on/in the interposer connector 5:

one or more pressure sensors for sensing pressure within the first hermetic internal cavity of the first package 7 and/or the second hermetic internal cavity of the second package 8;

getter means, such as moisture and/or particle getter means, for purifying the first hermetic internal cavity and/or the second hermetic internal cavity;

one or more microwave absorbers for minimizing/avoiding electromagnetic interference/noise/resonance/etc. within the first hermetic internal cavity and/or the second hermetic internal cavity.

In other words, the interposer connector 5 can be advantageously used to arrange/mount/install/integrate/house devices/means for purifying the first and second hermetic internal cavities, for sensing, for electromagnetic optimization, etc.

It is important to stress that the shapes and sizes of the first and second packages 7,8 shown in FIG. 4, as well as the shape and sizes of the interposer connector 5 shown in FIGS. 4 and 5, represent only examples for said first and second packages 7,8 and said interposer connector 5.

In fact, even if FIG. 4 shows that the first and second packages 7,8 are 3D structures (in particular, rectangular parallelepiped structures) having, each, a substantially rectangular base with base sizes bigger than a respective height, said first and second packages 7,8 might have shapes and sizes different than the ones shown in FIG. 4 (for example, they might conveniently have substantially square bases and/or, each, respective base sizes that are substantially equal to, or even smaller than, the respective height).

Similarly, even if FIG. 5 shows that the interposer connector 5 is a 3D structure (in particular, a rectangular parallelepiped structure), that has a substantially rectangular base with base sizes bigger than a respective height, and that has beveled corners, said interposer connector 5 might have a shape and sizes different than the ones shown in FIG. 5 (for example, it might conveniently have no beveled corners, or a substantially square base with or without beveled corners, and/or respective base sizes that are substantially equal to, or even smaller than, the respective height).

Again similarly, even if FIG. 4 shows that the first package 7 and the interposer connector 5 has substantially same base sizes, the second package 8 has bigger base sizes, and the interposer connector 5 has a height smaller than the heights of the first and second packages 7,8, the relations among the base sizes and the heights of the first and second packages 7,8 and of the interposer connector 5 might be different than the ones shown in FIG. 4. For example, the interposer connector 5 might conveniently have base sizes smaller than the ones of the first package 7, and/or said first package 7 might have base sizes that are substantially equal to, or even bigger than, the ones of the second package 8 (in this case, the interposer connector 5 might have base sizes substantially equal to, or smaller than, the ones of the second package 8), and/or the heights of the first and second packages 7,8 and of the interposer connector 5 might be substantially equal to one another.

Figure 8:
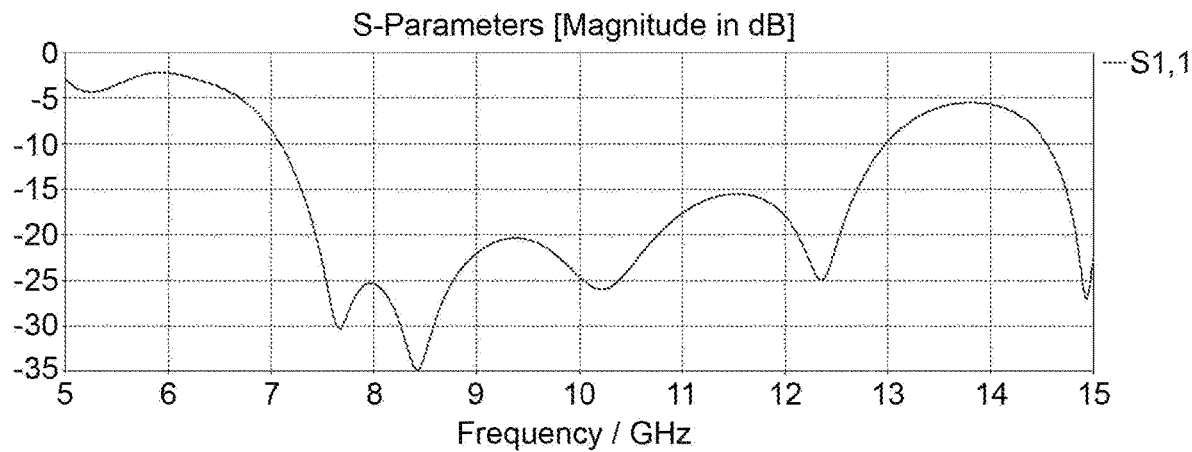
FIGS. 8 and 9 show simulated plots, respectively, of the return loss of the directional coupler of FIGS. 6 and 7, and of the far-field radiation pattern of the microwave antenna module of FIG. 3, for an example of specific configuration operating in X band.
Figure 9:
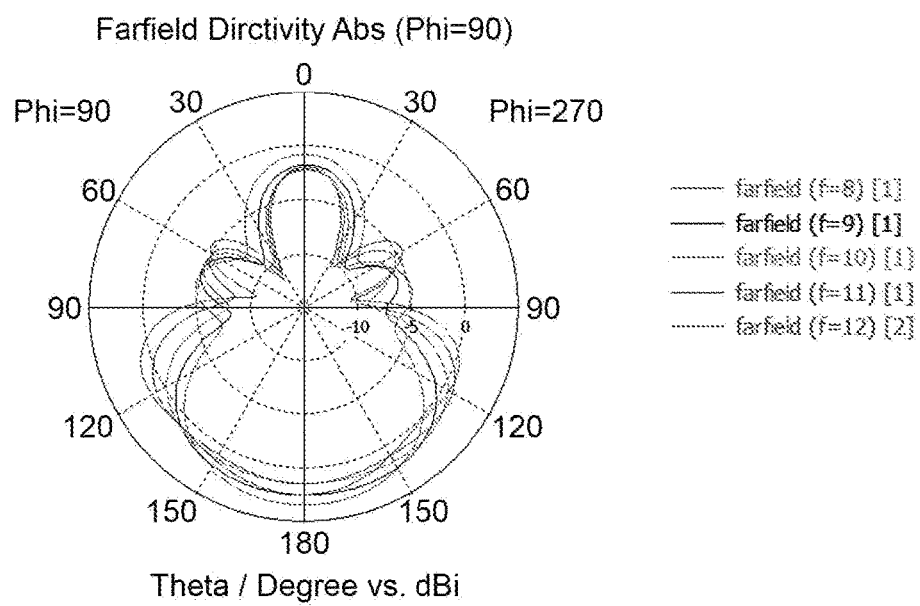

FIGS. 8 and 9 show simulated plots, respectively, of the return loss at the second input/output port 612 of the signal transmission line 61 of the directional coupler 6, and of the far-field radiation pattern of the microwave antenna module 3, for an example of specific configuration operating in X band.

From the foregoing description the technical advantages of the present invention are immediately clear.

In particular, it is important to point out that:

the microwave antenna module according to the present invention is characterized by a very small footprint, high performance, and high hermetic sealing levels, thereby being advantageously exploitable in microwave antenna systems installed on board space platforms (e.g., satellites), such as phased array antenna systems (for example, employed in SARs) and electronically steerable planar radiating arrays used as feeder in single/double-reflector antennas;

the microwave antenna module according to the present invention is suitable for "natural" implementation within highly integrated ceramic T/R modules, and is simple to manufacture by current hybrid circuit line manufacturing flows;

the directional coupler in stripline-coplanar configuration according to the present invention is characterized by a high directivity value (>20 dB) and supports a very wide operating bandwidth (close to 4 GHz);

as a consequence, the directional coupler according to the present invention provides a very high isolation between the signal and the antenna ports, with a very low coupling value in the full band, suitable for antenna calibration applications; this limits spurious signal "leakage" towards nearby radiating elements, thereby improving calibration accuracy;

the interposer connector according to the present invention enables a very efficient and reliable routing of microwave, control, power, ground and reference signals between the packages of the 3D PoP hybrid T/R module;

the integration of a well-matched, wide-band antenna directly onto the T/R module according to the present invention allows to dramatically improve performance of antenna systems employing the microwave antenna module according to the present invention;

tapered slot antennas have a better wideband performance with respect to the patch antennas, and are more suitable for direct integration onto a small footprint microwave hybrid module.

In conclusion, it is clear that numerous modifications and variants can be made to the present invention, all falling within the scope of the invention, as defined in the appended claims.

The invention claimed is:

1. Microwave antenna module for use in an antenna system installed on board a space platform, including a transmit/receive module, which comprises:
   a first package and a second package, that are hermetically sealed to one another and that are multilayer ceramic substrate packages; and
   an interposer connector, that is interposed between said first and second packages and comprises a body and connection means provided in said body;
   wherein first electronic circuitry is arranged within a first hermetic internal cavity of the first package, and second electronic circuitry is arranged within a second hermetic internal cavity of the second package;
   wherein the first and second electronic circuitries are connected to the connection means of the interposer connector for routing microwave, control and power signals through said connection means;
   wherein the connection means of the interposer connector include one or more microwave connection assemblies connected to the first and second electronic circuitries for microwave signals routing between said first and second electronic circuitries;
   characterized in that the first electronic circuitry includes a directional coupler in stripline-coplanar configuration;
   wherein each microwave connection assembly includes:
   a respective first metal element, that extends through the body perpendicularly to a top surface and a bottom surface of said body, protruding from said top and bottom surfaces;
   a respective first dielectric element, that
      is coaxial with, and extends around, the respective first metal element surrounding completely said respective first metal element, and
      extends through the body between the top surface and the bottom surface thereof; and
   respective second metal elements, that
      are spaced apart from, and surround at least partially, the respective first dielectric element,
      extend through the body perpendicularly to the top and bottom surfaces thereof, protruding from said top and bottom surfaces, and
      are in electrical contact with the body, thereby being at the same electrical potential as said body.

2. The microwave antenna module of claim 1, wherein the directional coupler includes a signal transmission line and a calibration transmission line electromagnetically coupled to each other;
   wherein the signal transmission line includes a first input/output port, and a second input/output port;
   wherein the first input/output port is designed to be fed with microwave signals to be radiated;
   wherein the second input/output port is designed to be connected to an antenna to feed said antenna with the microwave signals to be radiated and to receive incoming microwave signals received by said antenna;

wherein said first input/output port is further designed to output the incoming microwave signals;

wherein the calibration transmission line includes a calibration port and an isolation port, that is connected to an impedance matching a characteristic impedance of said calibration transmission line;

wherein the directional coupler includes a multilayer structure including dielectric and metal layers stacked on one another;

wherein the signal and calibration transmission lines are formed in a first region of one and the same given metal layer of the multilayer structure, which given metal layer is interposed between two dielectric layers arranged immediately on and below said given metal layer;

wherein a ground structure is formed in a second region of said given metal layer and is spaced apart from the signal and calibration transmission lines, thereby resulting in said signal and calibration transmission lines being arranged on one and the same plane along with the ground structure, and in a gap being present between said ground structure and said signal and calibration transmission lines;

wherein said gap is filled with a dielectric material surrounding said signal and calibration transmission lines;

wherein vias are formed to electrically connect the ground structure to upper and lower metal layers of the multilayer structure, thereby resulting in ground planes being arranged above and below the signal and calibration transmission lines.

3. The microwave antenna module of claim 2, further including an antenna assembled or integrated on the transmit/receive module and connected to the second input/output port of the signal transmission line of the directional coupler.

4. The microwave antenna module of claim 3, wherein the antenna is a tapered slot antenna.

5. The microwave antenna module according to claim 3, wherein the antenna is based on ceramic thin film technology.

6. The microwave antenna module according to claim 2, wherein the connection means of the interposer connector include at least a first microwave connection assembly and a second microwave connection assembly; and wherein the first electronic circuitry further includes:
   a high power amplifier, that is
      connected to the first microwave connection assembly to receive therethrough the microwave signals to be radiated, and
      designed to apply a high power amplification to said microwave signals to be radiated, thereby producing first amplified microwave signals;
   a low noise amplifier, that is
      designed to apply a low noise amplification to the incoming microwave signals, thereby producing second amplified microwave signals, and
      connected to the second microwave connection assembly to feed said second microwave connection assembly with the second amplified microwave signals; and
   a transmit/receive switch, or a circulator, that is interposed between the first input/output port of the directional coupler and said high power and low noise amplifiers for feeding
      said first input/output port with the first amplified microwave signals, and
      the low noise amplifier with the incoming microwave signals.

7. The microwave antenna module of claim 6, wherein the transmit/receive switch or circulator, the low noise amplifier and the high power amplifier are integrated into a Single Chip Front End Monolithic Microwave Integrated Circuit.

8. The microwave antenna module of claim 7, wherein the directional coupler is integrated into the Single Chip Front End Monolithic Microwave Integrated Circuit.

9. The microwave antenna module according to claim 1, wherein the connection means of the interposer connector further include one or more control/power connection assemblies connected to the first and second electronic circuitries for control signals routing between, and/or for power supply to, said first and second electronic circuitries;
   wherein each control/power connection assemblies includes:
   one or more respective third metal elements, each of which extends through the body perpendicularly to the top and bottom surfaces thereof, protruding from said top and bottom surfaces; and
   a respective second dielectric element, that extends
      around the respective third metal element(s) surrounding completely said respective third metal element(s), and
      through the body between the top surface and the bottom surface thereof.

10. The microwave antenna module according to claim 1, wherein the connection means of the interposer connector further include one or more fourth metal elements connected to the first and second electronic circuitries for reference/ground voltage routing between said first and second electronic circuitries; and wherein each fourth metal element:
   extends through the body perpendicularly to the top and bottom surfaces thereof, protruding from said top and bottom surfaces; and
   is in electrical contact with said body, thereby being at the same electrical potential as said body.

11. The microwave antenna module according to claim 1, wherein the metal elements are spring electrical contacts or ball contacts.

12. The microwave antenna module according to claim 1, wherein the body is:
   made of polymeric material, or of single-layer or multilayer ceramic material; and
   totally or partially coated with a metal material.

13. The microwave antenna module of claim 12, wherein a plurality of through holes with metalized walls are formed in the body; and wherein said through holes extend through said body between the top surface and the bottom surface thereof, perpendicularly to said top and bottom surfaces.

14. The microwave antenna module according to claim 1, wherein the body is made of metal.

15. The microwave antenna module according to claim 1, wherein the first and second packages are seam-welded to one another, or welded to one another by a solder of gold and tin, or laser-sealed to one another, thereby resulting in said first and second packages being hermetically sealed to one another.

16. The microwave antenna module according to claim 1, wherein one or more of the following devices/means are arranged on/in the interposer connector:
   one or more pressure sensors;
   getter means including moisture and/or particle getter means;
   one or more microwave absorbers.

17. Antenna system designed to be installed on board a space platform and including the microwave antenna module as claimed in claim 1.

18. Synthetic aperture radar designed to be installed on board a space platform and comprising the microwave antenna module as claimed in claim 1.

19. Space platform equipped with an antenna system fitted with the microwave antenna module as claimed in claim 1.

20. Satellite equipped with an antenna system fitted with the microwave antenna module as claimed in claim 1.

* * * * *